United States Patent
Baehr et al.

(10) Patent No.: US 7,756,649 B2
(45) Date of Patent: Jul. 13, 2010

(54) METHOD FOR FAULT DETECTION AND DIAGNOSIS OF A ROTARY MACHINE

(75) Inventors: Joachim Baehr, Darmstadt (DE); Rolf Isermann, Seeheim-Jugenheim (DE); Wolfgang Scheithe, Griesheim (DE); Dieter Thelen, Modautal (DE)

(73) Assignee: Schenck RoTec GmbH, Darmstadt (DE)

( * ) Notice: Subject to any disclaimer, the term of this patent is extended or adjusted under 35 U.S.C. 154(b) by 78 days.

(21) Appl. No.: 12/229,950

(22) Filed: Aug. 28, 2008

(65) Prior Publication Data

US 2009/0070050 A1 Mar. 12, 2009

(30) Foreign Application Priority Data

Sep. 6, 2007 (EP) .................................. 07017478

(51) Int. Cl.
*G06F 15/00* (2006.01)
(52) U.S. Cl. ........................................ 702/56; 702/145
(58) Field of Classification Search ................... 702/56, 702/145
See application file for complete search history.

(56) References Cited

U.S. PATENT DOCUMENTS

| | | | |
|---|---|---|---|
| 4,988,979 A * | 1/1991 | Sasaki et al. ................ | 340/683 |
| 6,553,837 B1 | 4/2003 | Lysen | |
| 6,779,404 B1 | 8/2004 | Brincker et al. | |
| 2002/0183942 A1 | 12/2002 | Lafleur et al. | |
| 2007/0250246 A1* | 10/2007 | Balasu ...................... | 701/101 |

* cited by examiner

*Primary Examiner*—Bryan Bui
(74) *Attorney, Agent, or Firm*—Collard & Roe, P.C.

(57) ABSTRACT

Modern rotary machine production requires built-in fault detection and diagnoses. The occurrence of faults, e.g. increased friction or loose bonds has to be detected as early as possible. Theses faults generate a nonlinear behavior. Therefore, a method for fault detection and diagnosis of a rotary machine is presented. Based on a rotor system model for the faulty and un-faulty case, subspace-based identification methods are used to compute singular values that are used as features for fault detection. The method is tested on an industrial rotor balancing machine.

5 Claims, 3 Drawing Sheets

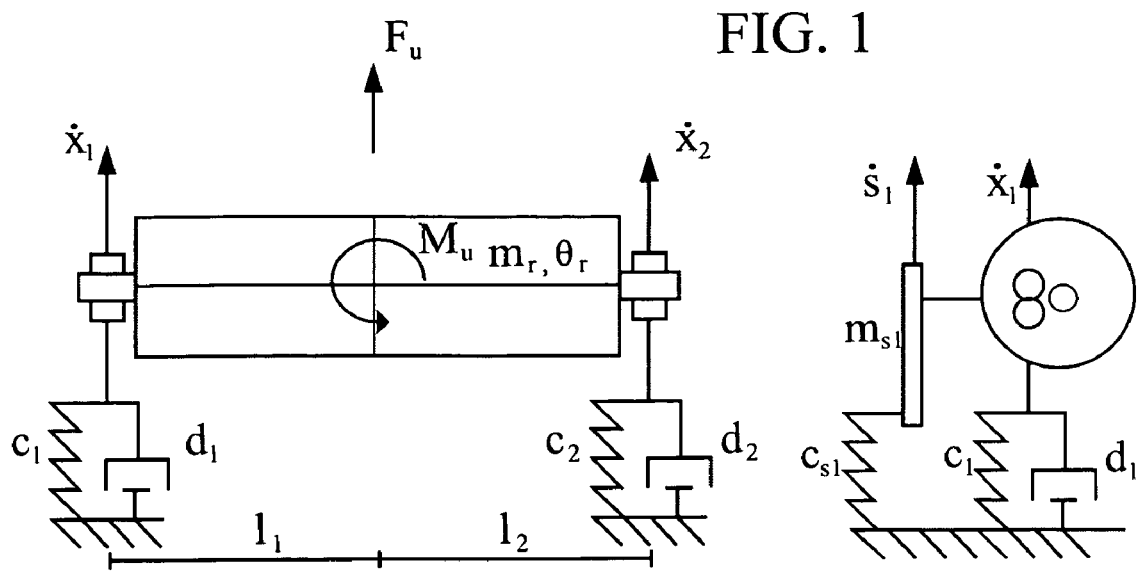
FIG. 1
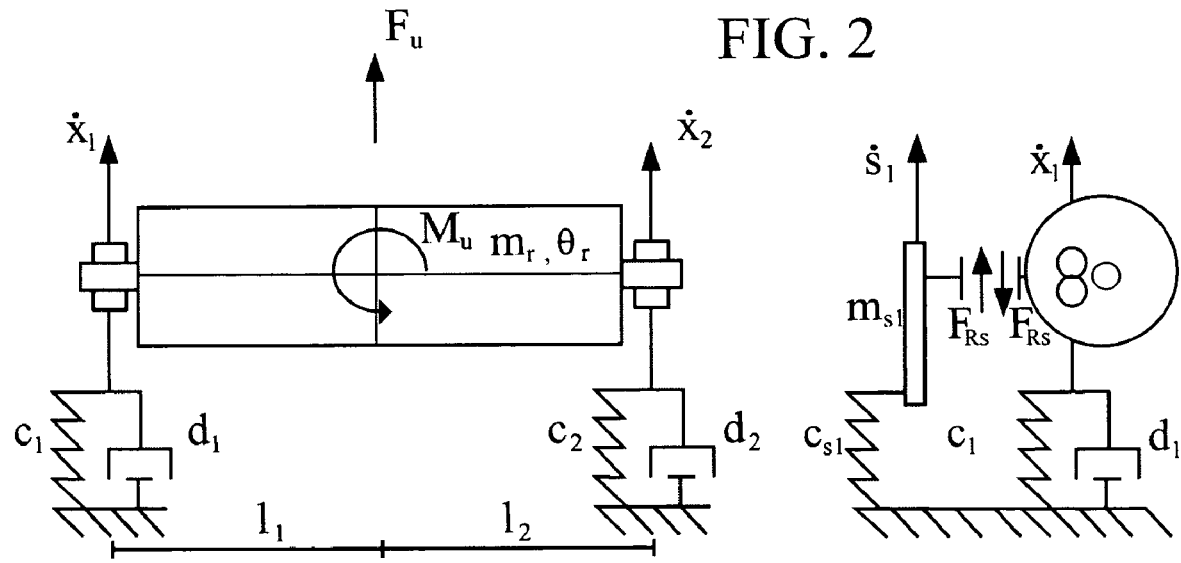
FIG. 2
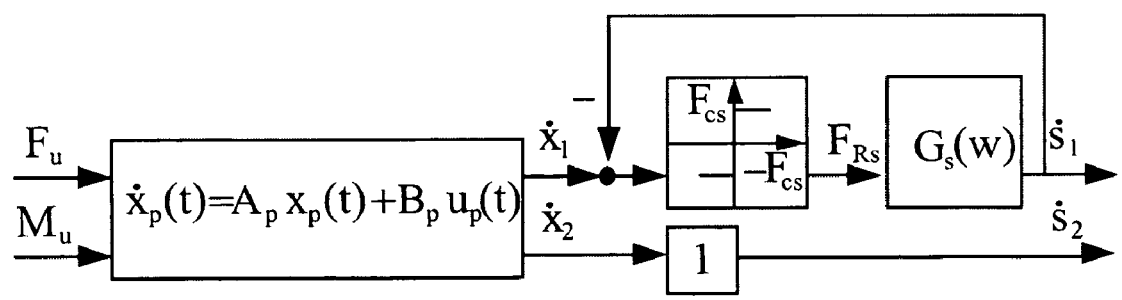

METHOD FOR FAULT DETECTION AND DIAGNOSIS OF A ROTARY MACHINE

CROSS REFERENCE TO RELATED APPLICATIONS

Applicants claim priority under 35 U.S.C. §119 of European Application No. 07017478.4 filed on Sep. 6, 2007.

BACKGROUND OF THE INVENTION

The invention relates to a method for fault detection and diagnosis of a rotary machine, in particular a balancing machine, wherein a rotor having an imbalance is rotated and excites a vibration in the rotary machine due to the imbalance-caused force, and wherein the rotational speed of the rotor and the vibrations are measured in order to obtain input data quantitative for the rotational speed and the vibrations.

SUMMARY OF THE INVENTION

A method for fault detection and diagnosis of a rotary machine, in particular a balancing machine is provided. A rotor having an imbalance is rotated and excites a vibration in the rotary machine due to the imbalance-caused force. The rotational speed of the rotor and the vibrations are measured in order to obtain input data quantitative for the rotational speed and the vibrations.

In accordance with the method, it is assumed that a process of dynamic behavior of the rotary machine can be modeled by a linear system in the un-faulty state. An over-determined set of linear equations is formed, which contains input and output data of the process and unknown states of the assumed linear system. The number of states needed to accurately model the process is extracted by using mathematical operations such as orthogonal or oblique projections to form a matrix of which the rank equals the assumed linear system. Singular values are computed by using Singular Value Decomposition for obtaining an approximate indication for the order of the assumed linear state.

BRIEF DESCRIPTION OF THE DRAWINGS

FIG. 1 shows a rotary system model for normal condition, wherein the rotor (mass $m_r$) movement in horizontal plane can be modeled with linear spring-damper systems (left drawing, birdview), the sensor plunger coils (masses $m_{s1}$, $m_{s2}$) are connected directly to the bearings, and as an example, the connection of plunger coil 1 is given in the right drawing (side view);

FIG. 2 shows the fault state of sliding friction in sensor connection;

DETAILED DESCRIPTION OF PREFERRED EMBODIMENTS

1 Introduction

Figure 3:
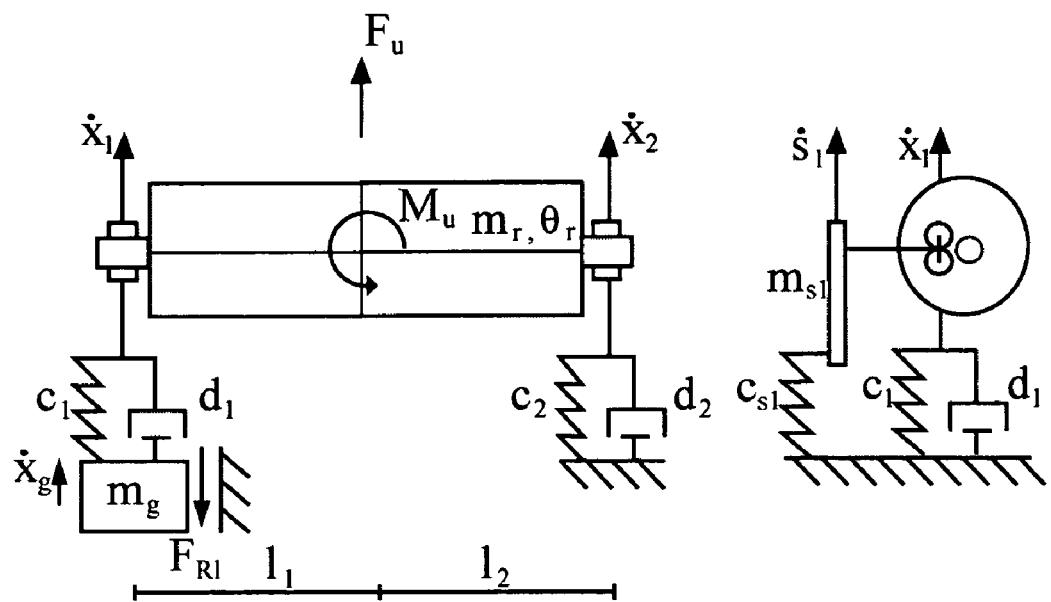
FIG. 3 shows the fault state of sliding friction between bearing support socket and ground.
Figure 3:
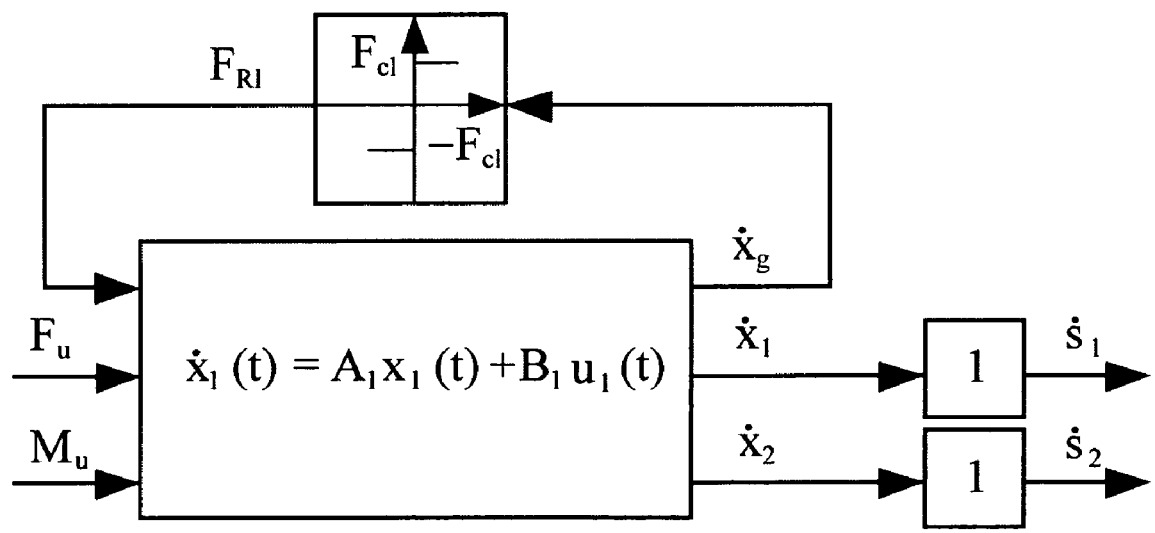
Figure 4:
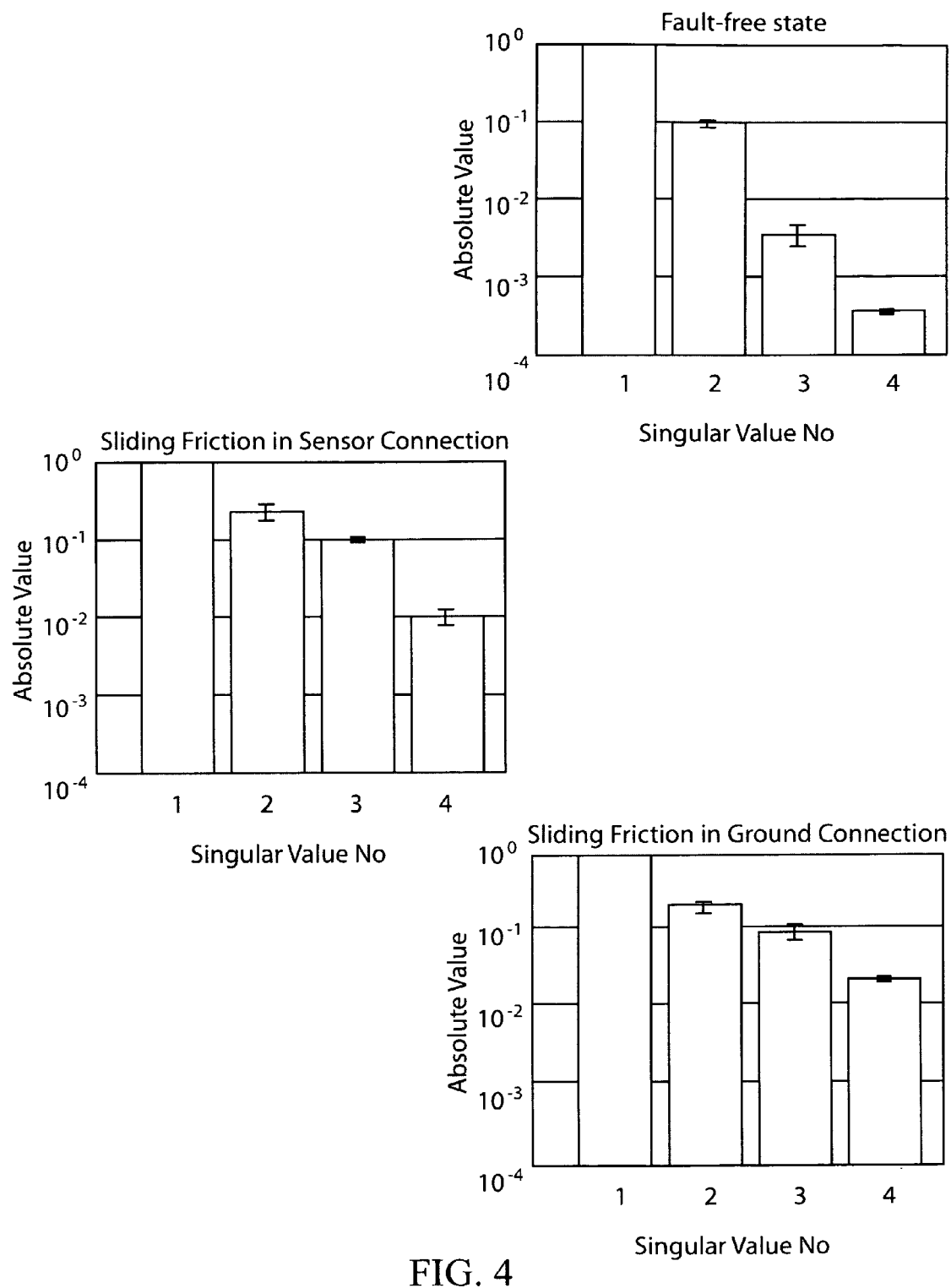
FIG. 4 shows singular values for normal and faulty states.

Fault detection and diagnosis is increasingly important for modern rotary machines. Currently, mostly limit checking and periodic maintenance cycles are used to detect faults. Sometimes signal-based fault detection is applied. However, these methods mainly rely on the knowledge of experts. This situation can be improved by model-based fault detection. As more information (proper excitation, process model, several measurements) is used, more accurate fault detection can be performed. Standard rotary systems behave basically linear. In case of specific faults, e.g. sliding friction, loose bonds and motion blocks, linear relations no longer hold. An indication for the nonlinearity can be used to detect these faults. Taking into account the noisy environment the method presented will use subspace approaches to estimate singular values. These singular values can be used to detect these faults.

2 Modeling

In order to design a model-based fault detection and diagnosis system, the dynamic behavior of the rotor system needs to be modeled. In a first step, a general model with two degrees of freedom for stiff rotors is given. For lower rotary speeds a simplified model can be applied.

It is assumed that the rotor is not fully balanced, so that an imbalance force $F_u$ and torque $M_u$ exist. The rotor is situated on two independent bearing supports. Their movement speeds in horizontal plane are denoted by $\dot{x}_1, \dot{x}_2$. Plunger coil sensors are used to measure these speeds, resulting in measurement values $\dot{s}_1, \dot{s}_2$ (see also FIG. 1).

2.1 Model for Stiff Rotors

Rotor and bearings are assumed to be stiff, the ground connection of the two bearing supports is modeled by two spring-damper systems. It is assumed furthermore that the sensor force feedback on the rotor movement can be neglected.

$$m_r \gg m_{s1}\ m_r \gg m_{s2}$$

$$c_1 \gg c_{s1}\ c_2 \gg c_{s2}$$

As long as the system stays in normal condition, it can be described by a linear state space system.

$$\dot{x}_m(t) = A_m x_m(t) + B_m u_m(t) \quad (1)$$

$$y_m(t) = C_m x_m(t)$$

Applying Newton's law of motion for a rotary mass it follows $$u_m(t) = (F_u(t)\ M_u(t))^T \quad (2)$$

$$x_m(t) = (\dot{x}_1(t)\ x_1(t)\ \dot{x}_2(t)\ x_2(t))^T \quad (3)$$

$$y_m(t) = (\dot{s}_1(t)\ \dot{s}_2(t))^T \quad (4)$$

$$A_m = \frac{1}{m_r \theta_r} \begin{pmatrix} (-\theta_r d_1 - m_r d_1 l_1^2) & (-m_r c_1 l_1^2 - \theta_r c_1) \\ 0 & m_r \theta_r \\ (l_2 m_r l_1 d_1 - \theta_r d_1) & (l_2 m_r l_1 c_1 - \theta_r c_1) \\ 0 & 0 \\ (-\theta_r d_2 + m_r l_2 d_2 l_1) & (-\theta_r c_2 + m_r l_2 c_2 l_1) \\ 0 & 0 \\ (-l_2^2 m_r d_2 - \theta_r d_2) & (-\theta_r c_2 - l_2^2 m_r c_2) \\ 0 & m_r \theta_r \end{pmatrix} \quad (5)$$

$$B_m = \begin{pmatrix} 1/m_r & -l_1/\theta_r \\ 0 & 0 \\ 1/m_r & l_2/\theta_r \\ 0 & 0 \end{pmatrix} \quad (6)$$

$$C_m = \begin{pmatrix} 1 & 0 & 0 & 0 \\ 0 & 0 & 1 & 0 \end{pmatrix} \quad (7)$$

However, this detailed model is not needed for the regarded rotary system. As it is operated in sub-critical region, certain simplifications can be made.

2.2 Reduced Model

Under the assumption that the machine is driven with sub-critical rotary speed, i.e. ($\omega_r \ll \omega_{crit}$) where $\omega_r$ is the actual rotary speed and $\omega_{crit}$ is the lower of the two critical speeds according to system (1) it can be assumed that $$m_1 \ddot{x}_1 \ll d_1 \dot{x}_1 \ll c_1 x_1$$

$$m_2 \ddot{x}_2 \ll d_2 \dot{x}_2 \ll c_2 x_2$$

With these simplifications the model reduces to a model of order two:

$$\dot{x}_r(t) = A_r x_r(t) + B_r u_r(t) \tag{8}$$

$$y_r(t) = C_r x_r(t) \tag{9}$$

$$u_r(t) = (\dot{s}_1(t)\ \dot{s}_2(t))^T \tag{10}$$

$$x_r(t) = (x_1(t)\ x_2(t))^T \tag{11}$$

$$y_r(t) = (F_u(t)\ M_u(t))^T \tag{12}$$

$$A_r = \begin{pmatrix} 0 & 0 \\ 0 & 0 \end{pmatrix} \tag{13}$$

$$B_r = \begin{pmatrix} 1 & 0 \\ 0 & 1 \end{pmatrix} \tag{14}$$

$$C_r = \begin{pmatrix} c_1 & c_2 \\ -c_1 l_1 & c_2 l_2 \end{pmatrix} \tag{15}$$

The system is observable and controllable, the poles are on the stability limit. Inputs and outputs are exchanged in order to match the state space structure. Discretization with small sampling time $T_0$ leads to $$x_d(k+1) = A_d x_d(k) + B_d u_d(k) \tag{16}$$

$$y_d(k) = C_d x_d(k) \tag{17}$$

$$u_d(k) = (\dot{s}_1(k)\ \dot{s}_2(k))^T \tag{18}$$

$$x_d(k) = (x_1(k)\ x_2(k))^T \tag{19}$$

$$y_d(k) = (F_u(k)\ M_u(k))^T \tag{20}$$

$$A_d = \begin{pmatrix} 1 & 0 \\ 0 & 1 \end{pmatrix} \tag{21}$$

$$B_d = \begin{pmatrix} T_0 & 0 \\ 0 & T_0 \end{pmatrix} \tag{22}$$

$$C_d = \begin{pmatrix} c_1 & c_2 \\ -c_1 l_1 & c_2 l_2 \end{pmatrix} \tag{23}$$

This model will be used as basis for fault detection.

2.3 Nonlinear Fault States

The presented method is used to detect two fault states where sliding friction occurs.

2.3.1 Sliding Friction in Sensor Connection

If the sensor is not connected properly to the left moving rotor support, the force is propagated via sliding friction. The propagated force $F_{Rs} = f(\dot{x}_1 - \dot{s}_1)$ is modeled as Coulomb dry friction. The sensor dynamics are described by the frequency response $G_s(w)$.

$$F_{Rs} = F_{cs} \text{sign}(\dot{x}_1 - \dot{s}_1) \tag{24}$$

$$G_s(w) = \frac{s}{m_s s^2 + c_s} \tag{25}$$

The sensor force feedback on the rotor movement is neglected. Thus, the relation is nonlinear in the outputs equation only.

$$\dot{x}_p(t) = A_p x_p(t) + B_p u_p(t) \tag{26}$$

$$y_p(t) = \begin{pmatrix} f(\dot{x}_1(t), G_s(w), F_{cs}) \\ \dot{x}_2(t) \end{pmatrix}$$

$$u_p(t) = (F_u(t)\ M_u(t))^T \tag{27}$$

$$x_p(t) = (\dot{x}_1(t)\ x_1(t)\ \dot{x}_2(t)\ x_2(t))^T \tag{28}$$

$$y_p(t) = (\dot{s}_1(t)\ \dot{s}_2(t))^T \tag{29}$$

$$A_p = A_m \tag{30}$$

$$B_p = B_m \tag{31}$$

2.3.2 Sliding Friction in Ground Connection

If the left rotor support is not properly connected to the ground, the bearing support socket (mass $m_g$) may move on the ground. FIG. (3) shows the dynamic behavior of this fault state. It is assumed that dry Coulomb friction persists between rotor support socket and the ground.

The dynamics may be described by a linear system with nonlinear feedback according to FIG. (3).

$$\dot{x}_1(t) = A_1 x_1(t) + B_1 u_1(t)$$

$$y_1(t) = C_1 x_1(t) \tag{32}$$

with $$u_1(t) = (F_u(t)\ M_u(t)\ F_{R1}(t))^T \tag{33}$$

$$x_1(t) = (\dot{x}_1(t)\ x_1(t)\ \dot{x}_2(t)\ x_2(t)\ \dot{x}_g(t)\ x_g(t))^T \tag{34}$$

$$y_1(t) = (\dot{s}_1(t)\ \dot{s}_2(t))^T \tag{35}$$

$$A_1 = \begin{pmatrix} & & \frac{(m_r d_1 l_1^2 + \Theta_r d_1)}{m_r \Theta_r} & \frac{(m_r c_1 l_1^2 + \Theta_r c_1)}{m_r \Theta_r} \\ & A_m & 0 & 0 \\ & & \frac{(-l_2 m_r l_1 d_1 + \Theta_r d_1)}{m_r \Theta_r} & \frac{(-l_2 m_r l_1 c_1 + \Theta_r c_1)}{m_r \Theta_r} \\ & & 0 & 0 \\ \frac{c_1}{m_g} & \frac{d_1}{m_g} & 0 & 0 & \frac{-c_1}{m_g} & \frac{-d_1}{m_g} \\ 0 & 0 & 0 & 0 & 1 & 0 \end{pmatrix} \tag{36}$$

-continued $$B_1 = \begin{pmatrix} & & 0 \\ & & 0 \\ & B_m & 0 \\ & & 0 \\ 0 & 0 & 1/m_g \\ 0 & 0 & 0 \end{pmatrix}$$ (37)

$$C_1 = \begin{pmatrix} C_m & 0 & 0 \\ & 0 & 0 \end{pmatrix}$$ (38)

$$F_{Ri} = F_d \text{sign}(\dot{x}_g(t))$$ (39)

2.3.3 Summary

The two described fault states introduce nonlinear behavior into the state space relation, either in the output equation or in the system equation. An approximation of this behavior with the reduced model according to section 2.2 turns out to be inaccurate.

2.4 Imbalance Force and Torque

It is assumed that the rotor is not fully balanced. The remaining imbalances cause an imbalance force $F_u$ and torque $M_u$. It is assumed that the rotor speed $\omega_r$ and rotor roll angle $\phi_r$ are known and the imbalance amplitudes $A_{u1}$, $A_{u2}$ and angles $\phi_{u1}$, $\phi_{u2}$ are measured or known. The imbalance force and torque can be modeled as $$F_u(t) = A_{u1}\omega_r^2(t)\cos(\varphi_r(t) + \varphi_{u1})$$ (40)

$$+ A_{u2}\omega_r^2(t)\cos(\varphi_r(t) + \varphi_{u2})$$ (41)

$$M_u(t) = l_1 A_{u1}\omega_r^2(t)\cos(\varphi_r(t) + \varphi_{u1})$$ (42)

$$- l_2 A_{u2}\omega_r^2(t)\cos(\varphi_r(t) + \varphi_{u2})$$ (43)

3 Estimation of the Degree of Linearity

As an approximate indication for the degree of linearity, common subspace-based methods are well-suited. The mathematical approach that is used can be described as follows:

It is assumed that the process can be modeled by a linear state space system in the un-faulty state.

Given the input and output data of the process, an overdetermined set of linear equations is constructed. The set of equations contains input data, output data and unknown states of the state space system.

The number of states needed to accurately model the process is extracted by mathematic operations such as orthogonal or oblique projections. The number of observable and controllable states equals the system order.

The problem of determining what number of states is needed to model the system is transformed to a matrix rank determination. This determination is performed approximately by computing the singular values via Singular Value Decomposition (SVD).

The computed singular values give an approximate indication for the order of the presumed state space system. If the given process strongly obeys the reduced model equations according to section (2.2), the method indicates a process of order two. If nonlinear behavior resides and the linear model does not fit, the indication becomes indistinct.

3.1 Linearity Indication

This subsection briefly describes the computation of the features for linearity indication. The used algorithm is partially known as MOESP (Multivariable Output-Error State Space).

3.1.1 State Space System

The input/output relation is assumed to match a linear state space relation according to equation (44). N samples of inputs and outputs are available.

$$x(k+1) = Ax(k) + Bu(k) + Bn(k)$$ (44)

$$y(k) = Cx(k) + Cm(k)$$ (45)

The system is observable and controllable of order n. m(k) and n(k) represent white noise sequences. Matrices A, B, C, D and the states x(k) can be transformed by a regular transformation to $$\overline{A} = T^{-1}AT$$

$$\overline{B} = T^{-1}B$$

$$\overline{C} = CT$$

$$\overline{x}(k) = T^{-1}x(k)$$ (46)

3.1.2 Alignment in Block Hankel Matrices

The measured data is aligned in block Hankel Matrices $$U_p = \begin{pmatrix} u(0) & u(1) & \cdots & u(j-i) \\ u(1) & u(2) & \cdots & u(j) \\ \vdots & \vdots & \ddots & \vdots \\ u(i-1) & u(i) & \cdots & u(i+j-2) \end{pmatrix}$$ (47)

$$U_f = \begin{pmatrix} u(i) & u(i+1) & \cdots & u(i+j-1) \\ u(i+1) & u(i+2) & \cdots & u(i+j) \\ \vdots & \vdots & \ddots & \vdots \\ u(2i-1) & u(2i) & \cdots & u(2i+j-2) \end{pmatrix}$$ (48)

$$Y_p = \begin{pmatrix} y(0) & y(1) & \cdots & y(j-i) \\ y(1) & y(2) & \cdots & y(j) \\ \vdots & \vdots & \ddots & \vdots \\ y(i-1) & y(i) & \cdots & y(i+j-2) \end{pmatrix}$$ (49)

$$Y_f = \begin{pmatrix} y(i) & y(i+1) & \cdots & y(i+j-1) \\ y(i+1) & y(i+2) & \cdots & y(i+j) \\ \vdots & \vdots & \ddots & \vdots \\ y(2i-1) & y(2i) & \cdots & y(2i+j-2) \end{pmatrix}$$ (50)

with $$u(k) = (\dot{s}_1(k)\dot{s}_2(k))^T$$

$$y(k) = (F_u(k)M_u(k))^T$$

N number of measurements 2i maximum order that can be indicated. User-chosen.

j=N−2i+1 if all measurements are used.

The matrices contain all available data and therefore all available information. A set of linear equations is formed which contains these Hankel Matrices and the state Vectors x(k). To explain the procedure, the noise influence is set to zero at this stage.

$$Y_p = \Gamma_i X_p + H_i U_p$$

$$Y_f = \Gamma_i X_f + H_i U_f$$ (51)

$$X_f = A^i X_p + \Delta_i U_p$$

To develop this set of equations, following matrices are used:

$$\Gamma_i = \left( C^T \ (CA)^T \ (CA^2)^T \ \ldots \ (CA^{i-1})^T \right)^T \tag{52}$$

$$\Delta_i (A^{i-1}B \ A^{i-2}B \ \ldots \ AB \ B) \tag{53}$$

$$H_i = \begin{pmatrix} D & 0 & 0 & \ldots & 0 \\ CB & D & 0 & \ldots & 0 \\ CAB & CB & D & \ldots & 0 \\ \vdots & \vdots & \vdots & \ldots & \ldots \\ CA^{i-2}B & CA^{i-3}B & CA^{i-4}B & \ldots & D \end{pmatrix} \tag{54}$$

The state matrices $X_p$ and $X_f$ are defined analogously to the input/output Hankel Matrices:

$$X_p = (x(0)x(1) \ldots x(j-1)) \tag{55}$$

$$X_f = (x(i)x(i+1) \ldots x(i+j-1)) \tag{56}$$

The set of equations (51) can easily be verified by direct insertion. By removing the unknown states from this set of equations the solution for $Y_f$ yields:

$$Y_f = \left( H_f \Gamma_i (\Delta_i - A^i \Gamma_i^\dagger H_i) \Gamma_i A^i \Gamma_i^\dagger \right) \begin{pmatrix} U_f \\ U_p \\ Y_p \end{pmatrix} \tag{57}$$

The notation † stands for the Moore-Penrose-Pseudoinverse. Equation (57) yields direct information on the linearity indication features. If the model is purely linear, the row space of $Y_f$ can be fully described by the row spaces $$\begin{pmatrix} U_f \\ U_p \\ Y_p \end{pmatrix}.$$

The row space of a matrix is the space spanned by its row vectors. If a matrix J is of full rank, its row space equals the row space of $J_z$ if $J = J_s J_z$.

3.1.3 Feature Extraction

For order extraction many different methods are known. The most common are N4SID, MOESP and CVA. As the underlying system is on the stability limit, the algorithm with the most direct order computation, MOESP, is used. Tests with real data as described in the following have approved this choice. MOESP uses a direct RQ decomposition of aligned Block Hankel Matrices:

$$\begin{pmatrix} U_f \\ U_p \\ Y_p \end{pmatrix} = \begin{pmatrix} R_{U_f} & 0 & 0 & 0 \\ 0 & R_{U_p} & 0 & 0 \\ 0 & 0 & R_{Y_p} & 0 \\ H_f R_{U_f} & \Gamma_i(\Delta_i - A^i \Gamma_i^\dagger H_i) R_{U_p} & \Gamma_i A^i \Gamma_i^\dagger R_{Y_p} & 0 \end{pmatrix} \begin{pmatrix} Q_{U_f} \\ Q_{U_p} \\ Q_{Y_p} \\ Q_{Y_f} \end{pmatrix} \tag{58}$$

with $$U_f = R_{U_f} Q_{U_f}, \ U_p = R_{U_p} Q_{U_p}, \ Y_p = R_{Y_p} Q_{Y_p}$$

From the first part, a matrix $\beta_r$, with rank=system order is extracted.

$$\beta_r = \left( \Gamma_i(\Delta_i - A^i \Gamma_i^\dagger H_i) R_{U_p} \ \Gamma_i A^i \Gamma_i^\dagger R_{Y_p} \right) \tag{59}$$

$$= (\Gamma_i \ \Gamma_i) \begin{pmatrix} (\Delta_i - A^i \Gamma_i^\dagger H_i) & 0 \\ 0 & A^i \Gamma_i^\dagger R_{Y_p} \end{pmatrix} \tag{60}$$

The rank of $\beta_r$ equals the number of linear independent vectors in its column space, which means that $$\mathrm{rank}(\beta_r) = \mathrm{rank}(\Gamma_i) = n \tag{61}$$

The column space of a matrix is the space spanned by its column vectors. If a matrix J is of full rank, its column space equals the column space of $J_z$ if $J = J_s J_z$.

A proper method can extract the 'true' order of the underlying system. In the case of a faulty, nonlinear behavior, the linearity indication differs from the described model of order two. To extract the matrix rank in an approximate way, Singular Value Decomposition (SVD) is used. The SVD of $\beta_r$ yields 3 matrices $U_1, S_1, V_1$ $$\beta_r = U_1 S_1 V_1^T \tag{62}$$

$$= U_1 \begin{pmatrix} \sigma_1 & 0 & \ldots & 0 \\ 0 & \sigma_2 & \ldots & 0 \\ \vdots & \vdots & \ddots & \vdots \\ 0 & 0 & \ldots & \sigma_i \end{pmatrix} V_1^T \tag{63}$$

$U_1$ and $V_1$ are orthogonal matrices. $S_1$ is a diagonal matrix which contains the singular values $\sigma_i$. In case of a fault-free, not noisy system, n singular values are nonzero while all other singular values are zero.

$$\sigma_1 > \ldots > \sigma_n > 0 \tag{64}$$

$$\sigma_{n+1} = \ldots = \sigma_{2i} = 0 \tag{65}$$

3.2 Noise Influence on Feature Extraction

Under the influence of noise (process noise as well as measurement noise), the SVD no longer yields clear order decisions. To represent noise influences, it will be assumed that the measurements y(k) are contaminated by white noise $n(k) = (n_1(k) n_2(k))^T$. The excitations u(k) contain noise $m(k) = (m_1(k) m_2(k))^T$. With $$N_p = \begin{pmatrix} n(0) & n(1) & \ldots & n(j-i) \\ n(1) & n(2) & \ldots & n(j) \\ \vdots & \vdots & \ddots & \vdots \\ n(i-1) & n(i) & \ldots & n(i+j-2) \end{pmatrix}$$

$$N_f = \begin{pmatrix} n(i) & n(i+1) & \ldots & n(i+j-1) \\ n(i+1) & n(i+2) & \ldots & n(i+j) \\ \vdots & \vdots & \ddots & \vdots \\ n(2i-1) & n(2i) & \ldots & n(2i+j-2) \end{pmatrix}$$

and subsequent formation of $M_p$ and $M_f$, equation (51) is enhanced to $$Y_p = \Gamma_i X_p + H_i U_p + H_i N_p + M_p$$

$$Y_f = \Gamma_i X_f + H_i U_f + H_i N_f + M_f \tag{66}$$

$$X_f = A^i X_p + \Delta_i U_p + \Delta_i N_p$$

The solution for $Y_f$ then yields $$Y_f = \left(H_f \; \Gamma_i(\Delta_i - A^i \; \Gamma_i^\dagger H_i)\Gamma_i A^i \Gamma_i^\dagger\right) \begin{pmatrix} U_f \\ U_p \\ Y_p \end{pmatrix} \quad (67)$$

$$+ \left(H_i \; I \; \Gamma_i(\Delta_i - A^i \; \Gamma_i^\dagger H_i) - \Gamma_i A^i \Gamma_i^\dagger\right) \begin{pmatrix} N_f \\ M_f \\ N_p \\ M_p \end{pmatrix} \quad (68)$$

and the SVD is performed on $$\beta_i = \beta_r + \left(H_i \; I \; \Gamma_i(\Delta_i - A^i \Gamma_i^\dagger H_i) - \Gamma_i A^i \Gamma_i^\dagger\right) \begin{pmatrix} N_f \\ M_f \\ N_p \\ M_p \end{pmatrix} / U_f \begin{pmatrix} U_p \\ Y_p \end{pmatrix}$$

$$= \beta_r + E_n$$

where $\beta_i = 2i \times 2i$ matrix with rank that has to be estimated $\beta_r = 2i \times 2i$ matrix with rank $n$ (n=system order)

$E_N = 2i \times 2i$ Matrix with full rank (noise representation)

The notation $$/ U_f \begin{pmatrix} U_p \\ Y_p \end{pmatrix}$$

stands for the orthogonal projection onto the row space of $$\begin{pmatrix} U_f \\ U_p \\ Y_p \end{pmatrix}.$$

where only the part lying in the row space of $$\begin{pmatrix} U_p \\ Y_p \end{pmatrix}$$

is considered. In literature, this projection is referred to as 'Oblique Projection'.

It is shown in [VOdM96] that $E_n \to 0$ for $N \to \infty$.

An infinite number of measurements is not achievable. However, if the Signal-to-Noise-Ratio (SNR) and the measurement number N is sufficiently high, the system impact on the Singular Values is larger than the noise influence (see [Lju99]) and $E_n \ll \beta_r$ holds and therefore rank $(\beta_i)$=rank $(\beta_r)$. Normally, the influence of $E_n$ is not fully negligible and the Singular Values computation yields $$\sigma_1 > \ldots > \sigma_n \gg \sigma_{n+1}, \ldots, \sigma_{2i} \quad (69)$$

The singular values representing the system structure dominate, all successive singular values represent the noise influence and are considerably lower.

4 Results

As test rig, a industrial production machine for rotors with mass $m_r \approx 25$ kg is used. It is equipped with 2 standard plunger coil sensors. The fundamentation can be adjusted by common clamps. The machine is driven in sub-critical rotary speed. The environment consists of normal industrial surrounding, e.g. other machines, noise etc.

Three different runs are analyzed:
Un-faulty standard run
Run with sliding friction in sensor connection
Run with sliding friction in ground connection The features described in the preceding section are computed for the 3 described states. All tests are done on the same machine with equal bearings and rotor. For each run, a timespan of 5 seconds is examined. The singular values are computed according to the preceding chapter. FIG. (4) gives an overview over the different features. The values are given in logarithmic scale, the standard deviation over all regarded runs is indicated.

The first two Singular Values, which represent the linear behavior, remain nearly equal. The third and fourth singular value refer to model inaccuracies and noise. In case of nonlinear behavior, their values are considerably higher than in the purely linear, un-faulty case. Principally, these values can be used as a feature for the appearance of nonlinear faults in linear systems.

The invention described above presents a subspace-based method to detect the occurrence of nonlinear fault states in linear systems. A rotor system was used as example. The fault-free state as well as two different fault cases have been modeled and tested on an industrial rotor balancing machine. It has been shown that the computed singular values are highly sensible to nonlinear fault states and are well-suited as features for the occurrence of the considered friction faults.

| Symbols and Abbreviations | | |
|---|---|---|
| Symbol | Unit | Description |
| $F_u$ | [N] | imbalance-caused force |
| $M_u$ | [Nm] | imbalance-caused torque |
| $\dot{x}_1$ | [m/sec] | movement speed of left rotor support |
| $\dot{x}_2$ | [m/sec] | movement speed of right rotor support |
| $\dot{s}_1, \dot{s}_2$ | [m/sec] | measurements by speed sensors |
| $c_1, c_2$ | [N/m] | spring constants |
| $d_1, d_2$ | [N/m] | damper constants |
| $m_r$ | [kg] | rotor mass |
| $\Theta_r$ | [kgm$^2$] | rotor moment of inertia |
| $l_1, l_2$ | [m] | distance to the center of gravity |
| $A_{u1}, A_{u2}$ | [1] | imbalance amplitude |
| $\Phi_{u1}, \Phi_{u2}$ | [1] | imbalance amplitude |
| $\omega_r$ | [rad/sec] | rotation speed |
| $\phi_r$ | [rad] | rotor roll angle |
| n(k), m(k) | | white noise sequences |

The invention claimed is:

1. A method for fault detection and diagnosis of a rotary machine comprising the following steps:
   (a) rotating a rotor having an imbalance is rotated at a rotational speed to excite vibrations in the rotary machine due to an imbalance-caused force;

(b) measuring the rotational speed of the rotor and the vibrations in order to obtain input data quantitative for the rotational speed and the vibrations;
(c) forming an over-determined set of linear equations containing input and output data of a process of dynamic behavior of the rotary machine and unknown states of an assumed linear system for the process in an unfaulty state;
(d) extracting a number of states needed to accurately model the process in the unfaulty state by using mathematical operations to form a matrix having a rank equal to the assumed linear system; and
(e) using Singular Value Decomposition to compute singular values for obtaining an approximate indication of an order of the assumed linear system.

2. The method of claim 1, wherein the assumed linear system is formed as a linear state space system.

3. The method of claim 1, wherein a common MOESP method which uses a direct decomposition of aligned Block Hankel Matrices is used for order extraction of the number of states.

4. The method of claim 1, wherein the rotor is rotated with a sub-critical rotational speed.

5. A non-transitory computer readable medium having computer program instructions stored therein for causing a computer processor to perform the method of claim 1.

* * * * *